July 18, 1967
H. COX ET AL
3,331,602
DOCUMENT FEEDING APPARATUS
Filed Dec. 10, 1965
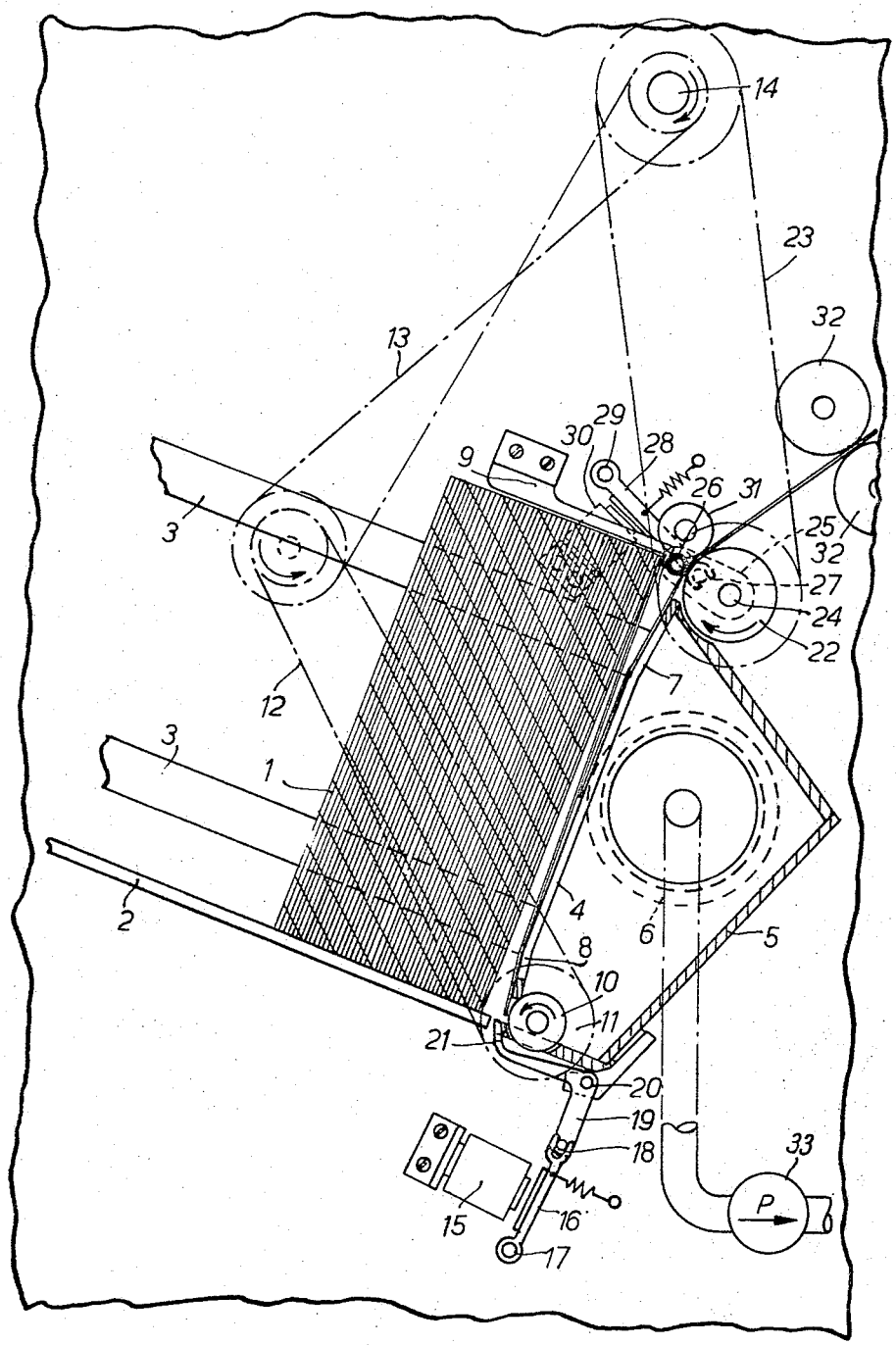
INVENTORS
HARRY COX
ALEXANDER BENNETT GOSLING
JAMES ARTHUR HOGG SHIEL
BY Hamm and Nydick
ATTORNEYS 3,331,602
DOCUMENT FEEDING APPARATUS
Harry Cox, Steeple Morden, Alexander Bennett Gosling, Whittlesford, and James Arthur Hogg Shiel, Longmeadow, Stevenage, England, assignors to International Computers and Tabulators Limited, London, England, a British company
Filed Dec. 10, 1965, Ser. No. 512,997
Claims priority, application Great Britain, Dec. 23, 1964, 52,177/64
10 Claims. (Cl. 271—11)

ABSTRACT OF THE DISCLOSURE

A document feeding device in which the rear edge of the document is sucked away from the document stack and a selectively operable lever engages the rear end of the document with a continuously rotating feed roll to feed the document backwards a short distance, so as to release the front edge of the document from a stop. The released front edge of the document is sucked away from the stack and a selectively operable pressure roll engages the front end of the document with a continuously rotating feed roll to feed the document forwards from the stack.

This invention relates to document feeding apparatus for feeding documents one at a time from a document stack. The documents may be, for example, conventional punched record cards, cheques or similar sheets.

Punched cards, and cheques with information recorded thereon by magnetic or other markings, are commonly used as input media for computers and other data processing devices which operate at relatively high speeds. This gives rise to a requirement to feed such documents at a relatively high rate, such as one thousand or more per minute. The documents are generally fed "on demand," that is, the feeding of each document is initiated independently by a control signal.

It will be appreciated that the feeding mechanism should be capable of responding very rapidly to the control signal, so that the delay between the application of the control signal and the consequent feeding of a document is small.

It is an object of the invention to provide an improved mechanism for feeding documents from a stack.

According to the invention, document feeding apparatus for feeding documents one at a time from a document stack includes retaining means adjacent a first edge of an outer document of the stack to restrain movement of said first edge outward from the stack in a direction substantially perpendicular to the surface of said outer document; means to displace a second edge of said outer document, opposite said first edge, outward from the stack; first selectively operable feeding means to engage said displaced second edge and to feed the outer document to release said first edge from the retaining means; means to displace said released first edge outwardly from the stack; and second selectively operable feeding means to engage said displaced first edge to feed the outer document away from the stack.

One embodiment of the invention will now be described, by way of example, with reference to the accompanying drawing, which is a schematic sectional elevation of a document feeding mechanism.

Referring to the drawing, a stack of documents 1 is supported on a flat bed plate 2. Opposite edges of the document stack 1 are guided by guide strips such as the strips 3. The plate 2 is at an angle to the horizontal such that the action of gravity causes one face of the stack 1 to rest lightly against an end plate 4, with the leading edge of the stack 1 being retained by a stop 9.

The end plate 4 forms one face of a vacuum box 5, which is connected by a pipe 6 to a vacuum pump 33. The plate 4 is provided with a number of slots, so that the reduced air pressure in the box 5 tends to hold the document which is on the face of the stack 1 against the outer surface of the plate 4. The front and rear ends 7 and 8, respectively, of the plate 4 are bent away from the face of the stack 1.

The reduced pressure in the vacuum box 5 draws down the rear part of the document which is on the face of the stack. The trailing edge of the document is bent outward from the stack 1 in a direction substantially perpendicular to the surface of the document as it is drawn down on to the portion 8 of the plate 4. This brings the trailing edge of the document immediately over a feed roller 10, which is continuously rotated in the direction indicated by the arrow. The roller 10 is mounted on the same shaft as a pulley 11 which is driven from a shaft 14, via belts 12 and 13. The shaft 14 is rotated continuously by an electric motor (not shown).

The feed roller 10 is normally ineffective to feed the document which is partly lying on the end plate 4. A short duration current pulse applied to the winding of an electromagnet 15 causes attraction of an armature 16, which is pivoted at 17. One end of the armature is forqed to engage a pin 18 which is mounted on a lever 19. The lever 19 can rock on a pivot 20, so that the movement of the armature 16 rocks the lever 19 in a clockwise direction. This rocking of the lever 19 causes an end portion 21 of the lever 19 to press the trailing edge of the document against the surface of the roller 10. The pressure exerted on the document is sufficient to cause the roller 10 to feed the document sufficiently far to withdraw the leading edge of the document from the stop 9. The duration of the operating pulse for the electromagnet 15 is not critical, since the excessive movement of the document is prevented by the trailing edge of the document engaging a pair of stops (not shown). Alternatively, the trailing edge may be restrained by the curved portion of the lever 19, which is immediately adjacent the end portion 21.

The release of the leading edge of the document allows the document to be drawn down completely on to the end plate 4 by suction from the box 5. The leading edge of the document is now bent away from the plane of the stack 1 over the portion 7 of the plate 4 and is positioned over a further feed roller 22. This feed roller 22 is driven continuously in the direction indicated by the arrow by means of a belt drive 23 from the shaft 14.

The roller 22 is mounted on a shaft 24. An arm 25 is also pivoted on the shaft 24 and carries a small free-running roller 26. A pin 27 is mounted on the arm 25 and is engaged by the forked end of an armature 28, which rocks on a pivot 29. Energisation of an electromagnet 30 causes attraction of the armature 28. The movement of the armature 28 is transmitted through the pin 27 to rock the arm 25 in a counterclockwise direction. The leading edge of the document being fed is pinched between the rollers 26 and 22, so that the document is fed forward by the rotation of the rollers 22. The frictional force exerted by the rollers 26 and 22 is sufficient to overcome the restraining force on the document produced by the reduced pressure in the box 5.

The leading edge of the document then passes between the roller 22 and a free-running pressure roller 31. This pair of rollers 22 and 31 continues to feed the document, so that the electromagnet 30 may then be de-energised. The leading edge of the document finally passes between another pair of feed rollers 32, which may feed the document into a document sensing device, for example, or such other utilisation device as may be desired. The rollers 32 may be driven from the shaft 14 via a belt drive (not shown), or they may be driven by a power source associated with the utilisation device.

The drawing shows the first document in the stack after it has been selected for feeding by sequential operation of the electromagnets 15 and 30 and has been fed partially out of the stack to the point at which the leading edge has been gripped by the rollers 32. Since this document has been moved away from the rear potrion 8 of the plate 4, the trailing edge of the next document has been drawn down on to the plate 4.

The next document is therefore already positioned ready for the next feed cycle to be initiated by energisation of the electromagnet 15.

The portions 7 and 8 have been shown as flat sections set at an angle to the main portion of the plate 4. These portions 7 and 8 may be curved instead of flat, or the whole plate 4 may be curved.

The small rearward movement of the document necessary to release the leading edge from the stop 9, and the bending of the leading and trailing edges away from the plane of the stack 1, together constitute a very efficient method of separating adjacent documents and thereby preventing the feeding of more than one document at a time.

The members 19 and 25, which control the feeding of the documents, have a relatively small mass and distance of travel and may therefore be operated very rapidly. However, the control may be effected in other ways. For example, one or both of the feed rollers 10 and 22 may be constructed as hollow cylinders with slots or holes in the periphery, so that they are made operative to feed a document by the selective connection of a source of reduced pressure to the inside of the cylinders.

The illustrated embodiment feeds documents from a stack the centre line of which is at a small angle to the horizontal. The modifications necessary for feeding from a stack in other positions will be apparent to those skilled in the art. For example, documents may be fed from the top of a vertically positioned stack by providing a conventional pile lifting mechanism which is controlled to maintain the top of the stack 1 in close proximity to the plate 4.

What is claimed is:

1. Document feeding apparatus for feeding documents one at a time from a document stack, including retaining means adjacent a first edge of an outer document of the stack to restrain movement of said first edge outward from the stack in a direction substantially perpendicular to the surface of said outer document; means to displace a second edge of said outer document, opposite said first edge, outward from the stack; first selectively operable feeding means to engage said displaced second edge and to feed the outer document to release said first edge from the retaining means; means to displace said released first edge outwardly from the stack; and second selectively operable feeding means to engage said displaced first edge to feed the outer document away from the stack.

2. Apparatus as claimed in claim 1, in which said means to displace said second edge includes first suction means to draw said second edge away from the stack.

3. Apparatus as claimed in claim 2, in which said means to displace said first edge includes second suction means to draw said first edge away from the stack.

4. Apparatus as claimed in claim 3, including a plate positioned adjacent the surface of said outer document and having perforated end portions forming part of said first and second suction means, respectively.

5. Apparatus as claimed in claim 4, including a box one side of which is formed by said plate; and means to connect said box to a suction pump.

6. Apparatus as claimed in claim 5, in which said end portions are inclined away from the stack.

7. Apparatus as claimed in claim 6, in which said first feeding means includes a first roller, a first solenoid and lever means operable by energisation of said solenoid to press said displaced second edge against said first roller; and in which said second feeding means includes a a second solenoid, and second and third rollers operable by energisation of said second solenoid to engage said displaced first edge for feeding said outer document away from the stack.

8. Apparatus as claimed in claim 1, in which said first feeding means includes a first roller; and first selectively operable pressure means to press said displaced second edge against said first roller to cause the feeding of said outer document.

9. Apparatus as claimed in claim 8, in which said first pressure means includes a solenoid; and lever means operable by energisation of said solenoid to press said displaced second edge against said first roller.

10. Apparatus as claimed in claim 9, in which said second feeding means includes a further solenoid; and feed roller means operable by energisation of said further solenoid to engage said displaced first edge for feeding said outer document away from the stack.

References Cited
UNITED STATES PATENTS

| | | | |
|---|---|---|---|
| 1,053,781 | 2/1913 | Brown | 271—32 |
| 2,524,417 | 10/1950 | Bamber | 271—32 X |
| 2,862,709 | 12/1958 | Lambombarde | 271—32 X |
| 3,133,784 | 5/1964 | Herter et al. | 271—11 X |

M. HENSON WOOD, Jr., *Primary Examiner.*

A. N. KNOWLES, *Assistant Examiner.*